F. J. VENNING.
LOCKING DEVICE.
APPLICATION FILED JULY 31, 1911.
1,086,692.
Patented Feb. 10, 1914.
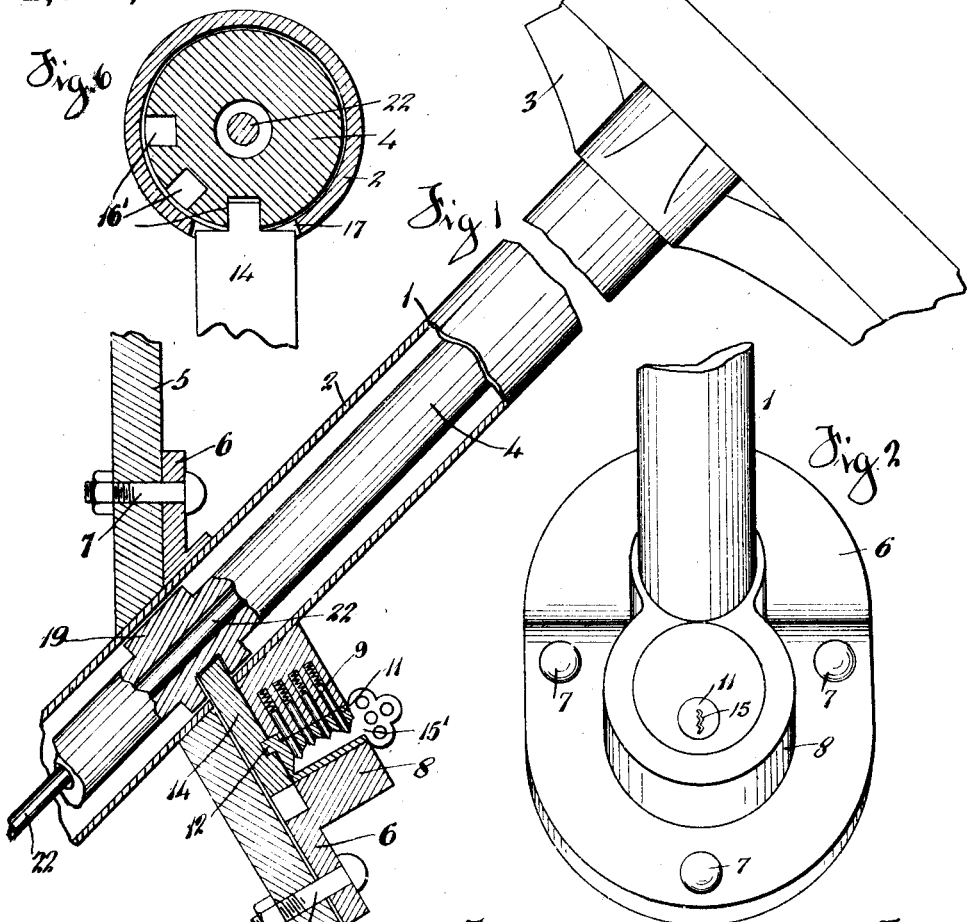
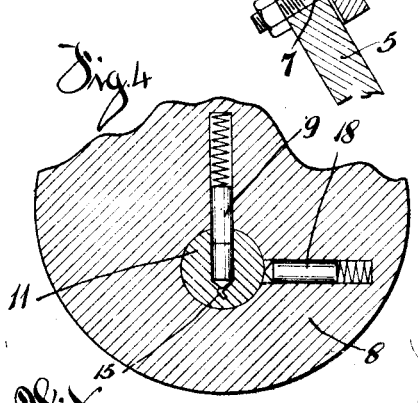
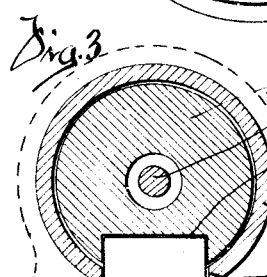
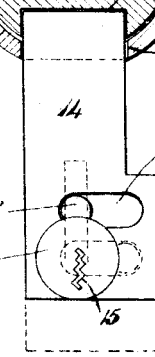
Witnesses
Oury W Thomas
Goldie Gordon
Inventor
Frank J. Venning
Francis N. Ramsey
Attorney

UNITED STATES PATENT OFFICE.

FRANK J. VENNING, OF CINCINNATI, OHIO.

LOCKING DEVICE.

1,086,692.   Specification of Letters Patent.   Patented Feb. 10, 1914.

Application filed July 31, 1911. Serial No. 641,621.

*To all whom it may concern:*

Be it known that I, FRANK J. VENNING, a citizen of the United States, residing at Cincinnati, in the county of Hamilton and State of Ohio, have invented certain new and useful Improvements in Locking Devices, of which the following is a specification.

My invention relates to locking devices for automobiles, motor cycles, bicycles and the like.

The object of my invention is to provide a simple, neat, efficient and inexpensive locking device that can be conveniently applied to the steering column in such a manner as to prevent the steering apparatus from being manipulated, thus preventing the control of the vehicle.

My invention consists in the combination with a steering shaft, of a lock having an escutcheon adapted to surround the steering column adjacent the dash and the floor of the vehicle, said lock being provided with a locking bar adapted to engage slots in the steering column for the purpose of controlling the movement of the steering mechanism.

My invention also consists in certain novel details of construction and in the combination and arrangement of parts as herein set forth and claimed.

In the drawings which serve to illustrate the construction and application of my device: Figure 1 is a vertical cross sectional view taken through a lock made in accordance with my invention, and applied to a steering column, parts of the steering column and dash of the vehicle being broken away. Fig. 2 is a front view of the device shown in Fig. 1; Fig. 3 is a view showing a section through the steering column, illustrating how the locking device engages the same, the tumbler being shown in position engaging said locking bar. Fig. 4 is a cross sectional view taken through the cylinder and tumbler of the lock. Fig. 5 is a perspective view of the cylinder. Fig. 6 is a modification showing a section through the steering column and illustrating how the steering shaft may be provided with a series of slots each of which may be engaged by the locking bar.

In the embodiment of my invention, as illustrated, and which shows a preferred construction, 1 represents a steering column comprising a casing 2, a steering wheel 3, and steering post or shaft 4 inside said casing 2, and to which said steering wheel 3 is fastened. The dash of the automobile is illustrated at 5, and the steering column is adapted to pass therethrough in the usual manner.

My improved locking device is adapted to be placed over the casing 2 of the steering column, the escutcheon 6 of said lock being adapted to be fastened to the dash 5 by means of bolts 7. Owing to the fact that automobiles are constructed and designed in many different styles, the steering column does not always pass through the dash at the same point; therefore, the construction of the escutcheon of the lock must be varied accordingly.

In many cases the throttle 22 is placed outside of the steering column instead of inside the steering post or shaft as shown. This is usually the case in the smaller automobiles. The lock can readily be adapted to avoid interference with the throttle in these cases.

The body 8, of the lock is preferably, formed integral with the escutcheon 6, and preferably contains mechanism known as the Yale lock, constructed of a series of spring pressed tumblers 9, adapted to enter suitable recesses or holes 10, in a cylinder 11, and said cylinder 11 is provided with an extending lug 12 which is adapted to enter a slot 13 in the locking bar 14, (Figs. 3 and 5).

The key way 15 is provided in the cylinder 11 and the key 15' is made of suitable shape so that when it is inserted and turned the cylinder also turns, the lug 12 carrying the locking bar 14, down to the dotted line position shown in Fig. 3. A suitable slot 17, is also provided in the casing 2 to allow the locking bar 14 to pass therethrough. It is readily seen that when the locking bar 14 is in its locked position, that the steering shaft 4 of the steering column cannot be moved either to the right or left, thereby making it impossible to manipulate the steering apparatus and effectually preventing the control of the machine.

In Fig. 1 I have illustrated my improved lock with the key inserted, thereby, causing the dividing line of the tumblers 9 to coincide with the upper line or periphery of the cylinder 11 thereby clearly illustrating how the key unlocks the tumblers. Now to prevent the cylinder from being jarred back into locking position when the machine is in operation. I provide an extra tumbler 18 (Fig. 4) which is placed preferably at right angles to the tumblers 9. This tumbler (or tumblers) 18, is adapted to enter the recesses 10 of the cylinder 11, when the cylinder is in its unlocked position, shown by dotted lines in Fig. 3, thus making it necessary to insert the key before turning the cylinder to its locked position again.

In order that I may not weaken the steering post or shaft 4, by placing the recess 16, therein, I provide said steering shaft with a boss 19. This not only prevents weakening of the steering shaft 4, but also prevents the steering shaft or post from being sprung out of engagement with said locking bar 14, there not being enough room or clearance between the boss 19 and the casing 2 to allow said springing of the steering post or shaft 14.

I do not wish to be understood by the illustrations as shown, to limit myself to the particular type of lock shown, as for instance I could readily apply a combination lock if desired.

My device can also be slightly changed in design so as to be applicable to motorcycles, bicycles and vehicles having a steering column post or shaft. I, therefore, do not wish to be confined to the exact details shown. If desired a series of recesses 16' can be provided in the steering post 4 as shown in Fig. 6.

The construction shown in Fig. 6 permits the machine to be locked when the front wheels are turned to either side or at an angle to the rear wheels, in which case the machine could only move in a circle, and could not, therefore, be driven far from its original position.

When it is desired to stop an automobile while on a grade, it is customary to turn the front wheels at an angle to the rear wheels and toward the curb of the street in order to avoid liability of the machine coasting down grade, in case the brake should be accidentally released. In this case the steering shaft would be moved to the proper angle to allow the locking bar to enter one of the slots to one side or the other of the center slot, as the case may be. (Fig. 6).

My invention is capable of considerable modification without material departure from the spirit or scope thereof. I do not, therefore, wish to be confined to the exact construction or arrangement herein set forth, but

What I claim as new and desire to secure by Letters Patent is:

1. In a locking device for automobiles, the combination with a steering column and dash, said steering column having a slot therein, of a lock, an escutcheon surrounding said steering column and securely fastened to said dash and carrying said lock, a steering shaft in said steering column, said steering shaft having a recess therein, a locking bar in said lock, a cylinder in said lock adapted to operate said locking bar, tumblers adapted to enter said tumbler and lock the same, and a keyway in said cylinder, substantially as set forth and for the purposes specified.

2. In a locking device for automobiles, the combination with a steering column and dash, said steering column having a slot therein, of a lock, an escutcheon surrounding said steering column and securely fastened to said dash and carrying said lock, a steering shaft in said steering column, a boss integrally formed on said steering shaft at a point adjacent the dash and having a recess therein, a locking bar in said lock, a cylinder in said lock adapted to operate said locking bar to engage the end thereof in said recess, tumblers adapted to enter said cylinders and lock the same, and a keyway in said cylinder, substantially as set forth and for the purposes specified.

3. In a locking device for automobiles, the combination with a dash and steering column having a slot therein, of an escutcheon surrounding said steering column and securely bolted to said dash, a lock integrally secured to said escutcheon, a steering shaft in said steering column, said steering shaft having a recess therein, a locking bar in said lock adapted to engage and disengage said recess, a cylinder in said lock adapted to operate said locking bar, tumblers adapted to enter said locking cylinder and lock same, and a keyway in said cylinder, substantially as set forth and for the purposes specified.

4. The combination with an automobile body and a steering staff of a collar fixed thereon and provided with a plurality of radially disposed sockets, a casing surrounding said collar and staff and secured to a part of the automobile body, a locking bolt slidably mounted in said casing and adapted to engage in the sockets in said collar, means for operating said bolt, and means for locking said bolt in operative and in inoperative positions.

5. The combination with an automobile body and a steering staff, of a collar fixedly secured thereto and provided with radially disposed sockets, a sliding bolt carried by a part of the automobile body and adapted to engage in said sockets to lock the staff against rotation, and means for operating said bolt.

6. An automobile lock comprising a casing having an opening therethrough to receive the steering staff of an automobile, and also provided with means for attaching the casing to the dash-board of an automobile and disposed with respect to the casing so as to bring the opening therein in position to receive the automobile staff, and locking mechanism within the casing for engagement with the staff to lock the same against turning.

7. An automobile lock comprising a casing having alined openings in the top and bottom thereof to receive the steering staff of an automobile, a collar rotatable within the casing in axial alinement with the top and bottom openings thereof and adapted to be rigidly secured to an automobile staff, locking mechanism within the casing to engage the collar and lock the steering staff against turning, and means carried by the casing for attaching the same to a part of the automobile and disposed with respect to the casing so as to bring the openings in the casing in position to receive the steering staff of an automobile.

8. An automobile lock comprising a casing having an opening to receive a steering staff and provided with an attaching plate disposed at such angle relative to the casing as to permit the opening to receive an installed steering staff, and locking mechanism within the casing for engaging the staff to lock the same against turning.

FRANK J. VENNING.

Witnesses:
JAMES N. RAMSEY,
GOLDIE GORDON.